(12) United States Patent
Indrieri et al.

(10) Patent No.: US 11,665,578 B2
(45) Date of Patent: May 30, 2023

(54) REMOTE RADIO UNIT (RRU) CONFIGURATION CONTROLLER

(71) Applicant: T-Mobile USA, Inc., Bellevue, WA (US)

(72) Inventors: Timothy Indrieri, Shadow Hills, CA (US); Leandro Recova, Chino, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 133 days.

(21) Appl. No.: 17/132,517

(22) Filed: Dec. 23, 2020

(65) Prior Publication Data

US 2022/0201540 A1 Jun. 23, 2022

(51) Int. Cl.
*H04W 28/02* (2009.01)
*H04W 24/02* (2009.01)
*H04W 88/08* (2009.01)

(52) U.S. Cl.
CPC ....... *H04W 28/0268* (2013.01); *H04W 24/02* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 4,232,317 A | * 11/1980 | Freeny, Jr. | G01S 5/06 342/464 |
| 8,923,134 B2 | 12/2014 | Meredith et al. | |
| 10,390,238 B1 | 8/2019 | Igelnik et al. | |
| 10,432,272 B1 | * 10/2019 | Black | H04B 7/0486 |
| 2003/0202104 A1 | 10/2003 | Werner | H04N 1/00137 348/207.99 |
| 2014/0141784 A1 | * 5/2014 | Schmidt | H04W 36/32 455/437 |
| 2018/0359770 A1 | * 12/2018 | Huang | H04W 72/1231 |
| 2019/0268786 A1 | * 8/2019 | Fischer | H02J 13/00017 |
| 2020/0145128 A1 | * 5/2020 | Black | H04L 1/0021 |

FOREIGN PATENT DOCUMENTS

| | | | |
|---|---|---|---|
| CN | 201877632 | * | 9/2010 |
| CN | 107404566 | * | 11/2017 |
| CN | 103052113 | * | 4/2019 |
| CN | 109788504 | * | 5/2019 |
| WO | WO2016166691 | * | 10/2016 |

* cited by examiner

*Primary Examiner* — Andre Tacdiran
(74) *Attorney, Agent, or Firm* — Han Santos, PLLC

(57) ABSTRACT

This disclosure describes techniques that enable a Remote Radio Unit (RRU) configuration controller to detect a misconfigured RRU on a base station node. The RRU configuration controller may be configured to capture telemetry data within a service sector of a base-station node. The RRU configuration controller may further determine a signal Quality of Service (QoS) associated with the service sector, based on the telemetry data. In doing so, the RRU configuration controller may determine whether the RRU associated with the service sector is misconfigured.

20 Claims, 6 Drawing Sheets

REMOTE RADIO UNIT (RRU) CONFIGURATION CONTROLLER

BACKGROUND

Mobile equipment networks provide real-time and continuous wireless communication services to subscribers through the deployment of wireless base station nodes and related control and support infrastructure, collectively termed a radio access network (RAN). Typically, base station nodes are deployed in a geometric arrangement to facilitate wireless service at any point within a geographic coverage area. The most common geometric arrangement for a RAN deployment is a set of hexagonal cells mapped over a geographic coverage area. Each cell has a radio tower constructed at the center.

Each base station node may include several Remote Radio Units (RRUs) that each service a radial sector of the geographic coverage area. For example, a base station node may include three RRUs that each service a 120-degree radial sector of the geographic coverage area. Each RRU is connected to a baseband unit using a dedicated cable. During maintenance of such a base station node, field workers may inadvertently connect a dedicated cable intended for one RRU with that of another RRU. The swap in cable connectivity at the RRU may cause a deterioration in a Quality of Service (QoS) within the service sector, ultimately impacting subscriber quality of experience. Present-day, field workers are tasked with manually identifying and rectifying misconfigured RRUs.

The detailed description is set forth with reference to the accompanying figures. In the figures, the left-most digit(s) of a reference number identifies the figure in which the reference number first appears. The use of the same reference numbers in different figures indicates similar or identical items or features.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates the computing environment within which the RRU configuration controller interacts with a base station node. FIG. 1B illustrates a detailed view of a telemetry bin within the computing environment.

DETAILED DESCRIPTION

Figure 1A:
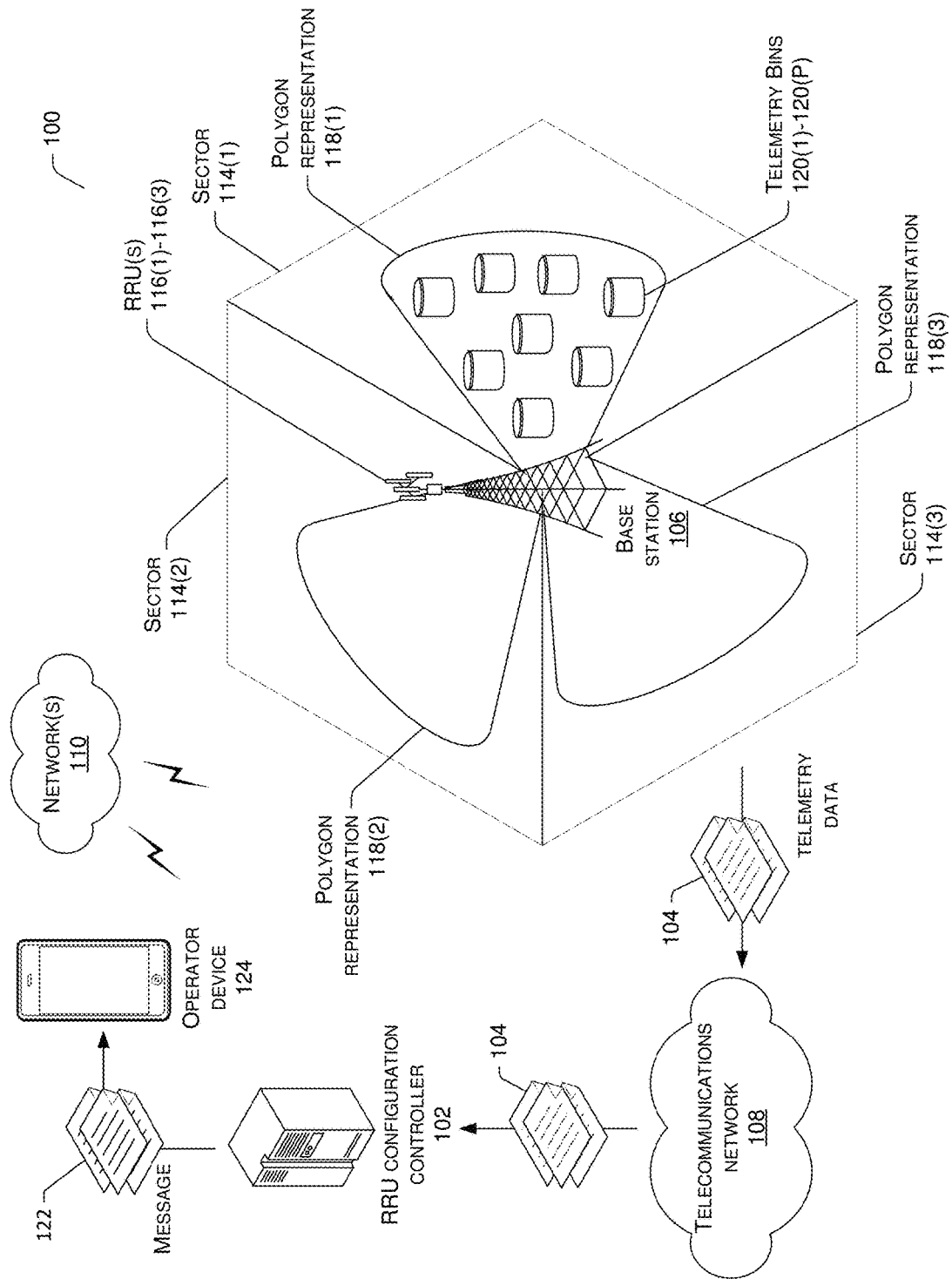
FIGS. 1A and 1B illustrate an example computing environment that facilitates the operation of the RRU configuration controller, in accordance with at least one embodiment.

This disclosure describes techniques for detecting a misconfigured Remote Radio Unit (RRU) at a base station node. Base station nodes typically include several RRUs that each serve a service sector of the base station node's service area. An RRU configuration controller is described that can dynamically infer the presence of a misconfigured RRU. The RRU configuration controller may monitor user devices within a service area of a base station node, capture corresponding telemetry data, and infer whether an RRU serving the user devices is misconfigured based on an analysis of the telemetry data. Telemetry data may include downlink throughput, uplink throughput, packet loss, latency, jitter, echo, or any suitable combination thereof.

Present-day, field workers are required to manually inspect and identify misconfigured RRUs, which can lead to delays in detecting and correcting a misconfiguration. A misconfigured RRU may refer to an RRU that is connected to a baseband unit using a cable intended for another RRU. For example, a first RRU may be connected to the baseband unit using a second cable intended for a second RRU. The inadvertent cable swap may cause the RRU to experience a marked reduction in performance, ultimately impacting a subscriber's quality of experience.

The RRU configuration controller may be configured to capture and analyze telemetry data of user devices within a service sector of a base station node in real-time, or near-real-time, thus obviating a reliance on field workers to manually identify misconfigured RRUs. In turn, the time taken to discover a misconfigured RRU is reduced, improving a subscriber's quality of experience. The term "real-time" is intended to describe the instantaneous analysis of telemetry data relative to the actual time that the telemetry data is captured. "Near-real-time" refers to a temporal delay between the time that the telemetry data is captured and the time that the telemetry data is analyzed. The temporal delay may be one second, one minute, one hour, or any other suitably appropriate time interval.

The RRU configuration controller may capture telemetry data of user devices at a plurality of "telemetry bins" within a service sector. Telemetry bins may represent discrete geographic locations within a service sector of a base station node from which an RF configuration controller may capture telemetry data associated with user devices. For example, if a user device transmits an RF signal (e.g. inbound or outbound RF transmission) and moves into a geographic location that is proximate to a telemetry bin, the RRU configuration controller may pull the telemetry data associated with the user device. Telemetry bins may be software-based or hardware-based, or a suitable combination of both. For software-based telemetry bins, the RRU configuration controller may pull telemetry data from user devices that transmit RF signals and move within a predetermined proximity of the telemetry bin. Software-based telemetry bins rely on detecting RF signal transmissions from user devices that are proximate to the telemetry bin at a time of transmission. Hardware-based telemetry bins, such as beacons, employ suitable wireless communication protocols to detect the presence of a user device within a predetermined proximity of the telemetry bin. Once detected, the RRU configuration controller may pull the telemetry data from the user device.

Collectively, telemetry bins within a service sector may capture a representative portion of telemetry data transmitted within the service sector. Thus, the telemetry data captured at telemetry bins within a service sector may be associated with the RRU that is serving the service sector.

To analyze the telemetry data in each service sector, the RRU configuration controller may overlay a polygon representation onto a map of a service sector. The polygon representation may have a vertex at the base station node and may overlay the substantial QoS bounds of the service sector. Substantial QoS bounds of the service sector may be based on the geographic area of the service sector within which the serving RRU can maintain RF signals within a signal QoS data that is greater than or equal to a predetermined QoS threshold.

Therefore, the telemetry data gleaned from telemetry bins within the bounds of the polygon representation of a service sector are attributable to that service sector. The RRU configuration controller may employ one or more trained-machine learning algorithms to analyze the telemetry data and determine a signal QoS data for the service sector. The signal QoS data may describe or measure the overall performance of an RF signal associated with the RRU, based on the telemetry data, and as experienced by the user device. To quantitatively measure signal QoS data, the RRU configuration controller may analyze suitable combinations of the telemetry data, such as packet loss, bit rate, throughput, latency, availability, and jitter. The signal QoS data may include measurements of a Reference Signal Received Power (RSRP) and/or Reference Signal Received Quality (RSRQ).

Performance of an RRU may be inferred by comparing a signal QoS data of a service sector relative to a QoS threshold. The QoS threshold may be defined by expected performance measures of the RRU. If the signal QoS data is equal to the QoS threshold, the RRU is performing as expected. If the signal QoS data is greater than the QoS threshold, the RRU is performing better than expected, and if the signal QoS data is less than the QoS threshold, the RRU is underperforming.

In some examples, the RRU configuration controller may determine the QoS threshold based on historical telemetry data associated with the RRU. For example, the RRU configuration controller may retrieve, from a data store, historical telemetry data associated with an RRU. The RRU configuration controller may employ one or more trained machine-learning algorithms to analyze the historical telemetry data to determine a QoS threshold. The QoS threshold may be based on any suitable combination of signal QoS data (e.g. downlink throughput, uplink throughput, packet loss, latency, jitter, or echo) or measurements thereof (e.g. RSRP or RSRQ).

The RRU configuration controller may generate a QoS score that reflects an analysis of the signal QoS data relative to the QoS threshold. In one embodiment, the QoS score may be based on the signal QoS data of individual telemetry bins. The RRU configuration controller may aggregate the QoS scores of each telemetry bin to determine a QoS score for a service sector. In another embodiment, rather than calculating QoS scores for individual telemetry bins and then aggregating the QoS scores, the QoS score may be based on an aggregate signal QoS data for the service sector.

The RRU configuration controller may also employ one or more trained machine-learning algorithms to analyze the telemetry data to determine changes in signal QoS data across the geographic area of a service sector. In this way, the RRU configuration controller may determine whether an underperformance in signal QoS data is likely due to a misconfigured RRU. For example, if the signal QoS data at a specific telemetry bin (e.g. discrete geographic position) reflects underperformance, while other signal QoS data (e.g. other telemetry bins) within the remaining regions of the service sector reflects adequate performance, the RRU configuration controller may infer that the localized underperformance is inconsistent with a misconfigured RRU, and is more likely attributable to a physical or electromagnetic RF signal obstruction. However, if the signal QoS data measured across telemetry bins within a service sector reflects a uniform underperformance or a uniform rate of signal attenuation that is relative to distance from the base station node, the RRU configuration controller may infer that such underperformance may be attributable to a misconfigured RRU. RF signals typically degrade (e.g. signal attenuation) with distance from a transmitting source, which in this case is the RRU. Therefore, a uniform rate of signal attenuation with distance from the RRU can reflect a properly configured RRU.

Accordingly, an analysis of the changes in signal QoS data may provide the RRU configuration controller with the ability to avoid false-positive declarations of a misconfigured RRU.

In response to determining that an RRU is misconfigured, the RRU configuration controller may generate a message for delivery to an operator device associated with the base station node. The message may indicate that the RRU is likely misconfigured. The operator device may be associated with a field worker responsible for the base station node, an operator of the base station node, or any other suitable personnel that may correct a misconfigured RRU.

Moreover, in response to determining that the RRU is misconfigured, the RRU configuration controller may infer that at least one other RRU is also misconfigured because the misconfiguration is based on an inadvertent swap of cables from a common, baseband unit. Accordingly, the RRU configuration controller may analyze the service sectors of the remaining RRUs to identify at least one other RRU that is misconfigured.

Further, the term "techniques," as used herein, may refer to system(s), method(s), computer-readable instruction(s), module(s), algorithms, hardware logic, and/or operation(s) as permitted by the context described above and through the document.

Figure 1B:
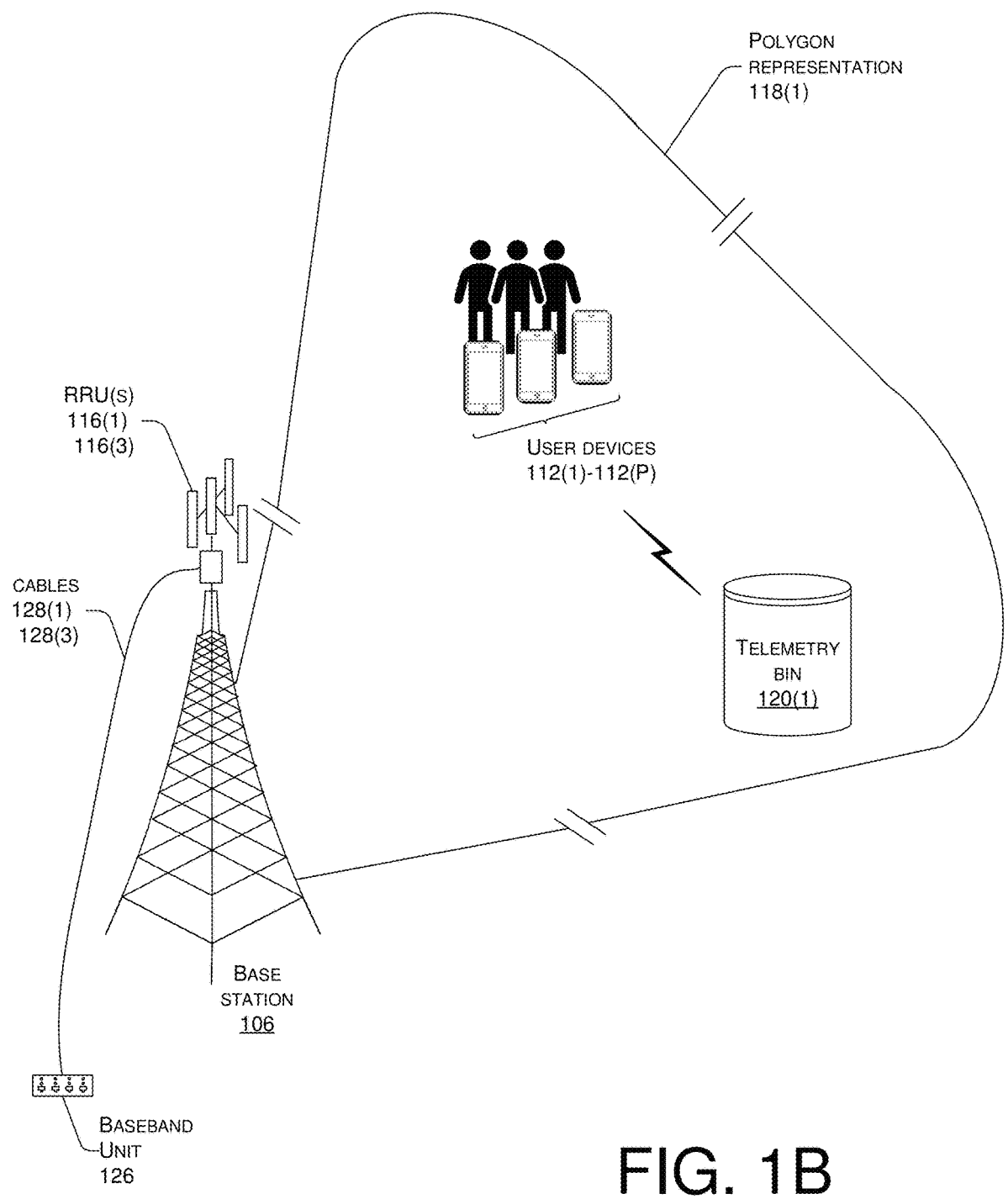

FIGS. 1A and 1B illustrate an example computing environment that facilitates the operation of the RRU configuration controller, in accordance with at least one embodiment. FIG. 1A illustrates the computing environment within which the RRU configuration controller interacts with a tri-sector base station node. FIG. 1B illustrates a detailed view of a telemetry bin within a service sector of the base station node. A tri-sector base station node refers to a base station node that has been divided into three service sectors. While FIGS. 1A and 1B illustrate a tri-sector base station node, one of ordinary skill in part may appreciate that variations and modification can be made such that the RRU configuration controller 102 may operate to analyze a base station node with any suitable plurality of sectors.

Referring to FIG. 1A, the RRU configuration controller 102 may capture telemetry data 104 from a base station node 106 of a telecommunications network 108, via one or more network(s) 110. The telecommunications network 108 may provide telecommunications and data communications in accordance with one or more technical standards, such as Enhanced Data Rates for GSM Evolution (EDGE), Wideband Code Division Multiple Access (W-CDMA), High-Speed Packet Access (HSPA), Long Term Evolution (LTE), 5G New Radio (5G NR), CDMA-2000 (Code Division Multiple Access 2000), and/or so forth. The telecommunications network 108 may include a core network that may provide telecommunication and data services to multiple computing devices, such as user device(s) 112(1)-112(N).

The base station node 106 is traditionally responsible for handling voice and data traffic between user equipment and a telecommunications network 108. The base station node 106 may be sectorized, meaning that the 360-degree service area planform is divided into several service sectors. In the illustrated example, the base station node 106 is divided into three service sectors, namely service sectors 114(1)-114(3).

Each of the service sectors 114(1)-114(3) may be supported by dedicated RRUs 116(1)-116(3). In the illustrated example, the RRU configuration controller 102 may overlay polygon representations 118(1)-118(3) over a map of the service sectors 114(1)-114(3) to reflect the geographic area within which the RRUs 116(1)-116(3) are expected to service.

Within each of the polygon representations 118(1)-118(3), the RRU configuration controller 102 may capture telemetry data 104 from telemetry bin(s) 120(1)-120(P). Each telemetry bin(s) 120(1)-120(P) may represent geographic locations at which the RRU configuration controller 102 capture telemetry data 104 from user devices 112(1)-112(N). For example, if one of the user device(s) 112(1)-112(N) transmits an RF signal and moves into a geographic location that is proximate to a telemetry bin 120(1), the RRU configuration controller 102 may capture telemetry data 104 associated with one of the user device(s) 112(1)-112(N).

The RRU configuration controller 102 may analyze the telemetry data 104 to determine a signal Quality of Service (QoS) data for each of the service sectors 114(1)-114(3) of the base station node 106. The signal QoS data may measure the overall performance of RF signal transmissions within the serving sector, based at least in part on the telemetry data 104. In one embodiment, the RRU configuration controller 102 may aggregate the telemetry data 104 across telemetry bin(s) 120(1)-120(P) within a service sector 114(1) and determine the signal QoS data for the service sector using the aggregated telemetry data. In another embodiment, the RRU configuration controller 102 may determine the signal QoS data for each of the telemetry bin(s) 120(1)-120(P) within a service sector, and determine the signal QoS data for the service sector by aggregating the signal QoS data of each of the telemetry bin(s) 120(1)-120(P).

The RRU configuration controller 102 may infer whether an RRU 116(1) is misconfigured based on a comparison of signal QoS data for the service sector and a predetermined QoS threshold.

In response to determining that the RRU 116(1) is misconfigured, the RRU configuration controller 102 may generate a message 122 for delivery to an operator device 124, via one or more network(s) 110. The message may indicate that the RRU 116(1) is likely misconfigured. The message 122 may further indicate that at least one other RRU, namely RRU 116(2) or RRU 116(3), is likely misconfigured since the misconfiguration is premised on a cable swap from a common, baseband unit 126.

The RRU configuration controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the operator device 124 and the user device 112(1)-112(N) via one or more network(s) 110.

The one or more network(s) 110 may include public networks such as the Internet, private networks such as an institutional and/or personal intranet, or some combination of a private and public network(s). The one or more network(s) can also include any type of wired and/or wireless network, including but not limited to local area network (LANs), wide area network(s) (WANs), satellite networks, cable networks, Wi-Fi® networks, Wi-Max networks, mobile communications networks (i.e. 5G-NR, LTE, 3G, 2G), or any combination thereof.

Moreover, the operator device 124 and the user device 112(1)-112(N) may include any sort of electronic device, such as a television unit, a multimedia streaming device, a cellular phone, a smartphone, a tablet computer, an electronic reader, a media player, a gaming device, a personal computer (PC), a laptop computer, etc. The operator device 124 and the user device 112(1)-112(N) may also include network devices that act as intermediaries with the Internet. It is noteworthy that the Internet is accessible via one or more network(s) 110. In some examples, the operator device and the user device 112(1)-112(N) may include a subscriber identity module (SIM), such as an eSIM, to identify each device to a telecommunication service provider (also referred to herein, as "telecommunications network").

FIG. 1B illustrates a detailed view of a telemetry bin within a service sector of a base station node. The base station node 106 may comprise RRUs 116(1)-116(3) and a baseband unit 126. In the illustrated example of FIG. 1A, the base station node 106 is sectorized into three service sectors, namely sectors 114(1)-114(3). Base station nodes may be sectorized, meaning that the 360-degree directional service area is divided into several service sectors, with each sector being served by an RRU. In some examples, a service sector may be served by more than one RRU. However, for purposes of clarity and to appropriately distinguish between RRUs of different service sectors, this disclosure describes each service sector as being served by one RRU.

In the illustrated example, each of three service sectors 114(1)-114(3) are served by dedicated RRUs 116(1)-116(3). Each RRU has a separation direction of tracking with respect to adjacent RRUs. The RRUs for a tri-sector base station node (e.g. base station node with three service sectors) typically have a 120-degree tracking with respect to the two adjacent RRUs.

The RRUs 116(1)-116(3) may be configured to receive digital information and control signals from a baseband unit 126 via cable(s) 128(1)-128(3), and further modulate this information into a radio frequency (RF) signal that is then transmitted through the RF antenna(s). The RRU 116(1) may also receive RF signals from the RF antenna(s), demodulate the RF signals, and supply the demodulated signals to the baseband unit 126. Each of the RRUs 116(1)-116(3) is connected to the baseband unit 126 via a dedicated cable. For example, RRU 116(1)(1) is connected to the baseband unit 126 via cable 128(1), RRU 116(1)(2) via cable 128(2), and RRU 116(1)(3) via cable 128(3). An RRU may be misconfigured if the cables connecting the RRUs 116(1)-116(3) to the baseband unit 126 are swapped. For example, RRU 116(1)(1) may be misconfigured if it is connected to the baseband unit 126 using cable 128(2) or cable 128(3).

The baseband unit 126 may be configured to process the demodulated signals received from the RRUs 116(1)-116(3) into a format suitable for transmission over a backhaul communication system of a telecommunications network. The baseband unit 126 may also process signals received from the backhaul communication system and supply the processed signals to the RRUs 116(1)-116(3) for modulation into RF signals.

The RRU configuration controller 102 may capture the telemetry data 104 at telemetry bin(s) 120(1)-120(P) that are positioned within the service sector. In the illustrated example of FIG. 1B, telemetry bin 120(1) may capture telemetry data 104 associated with user device 112(1)-112(N) that are proximate to the telemetry bin 120(1) within the service sector 114(1) (e.g. polygon representation 118(1) of the service sector 114(1)).

Figure 2:
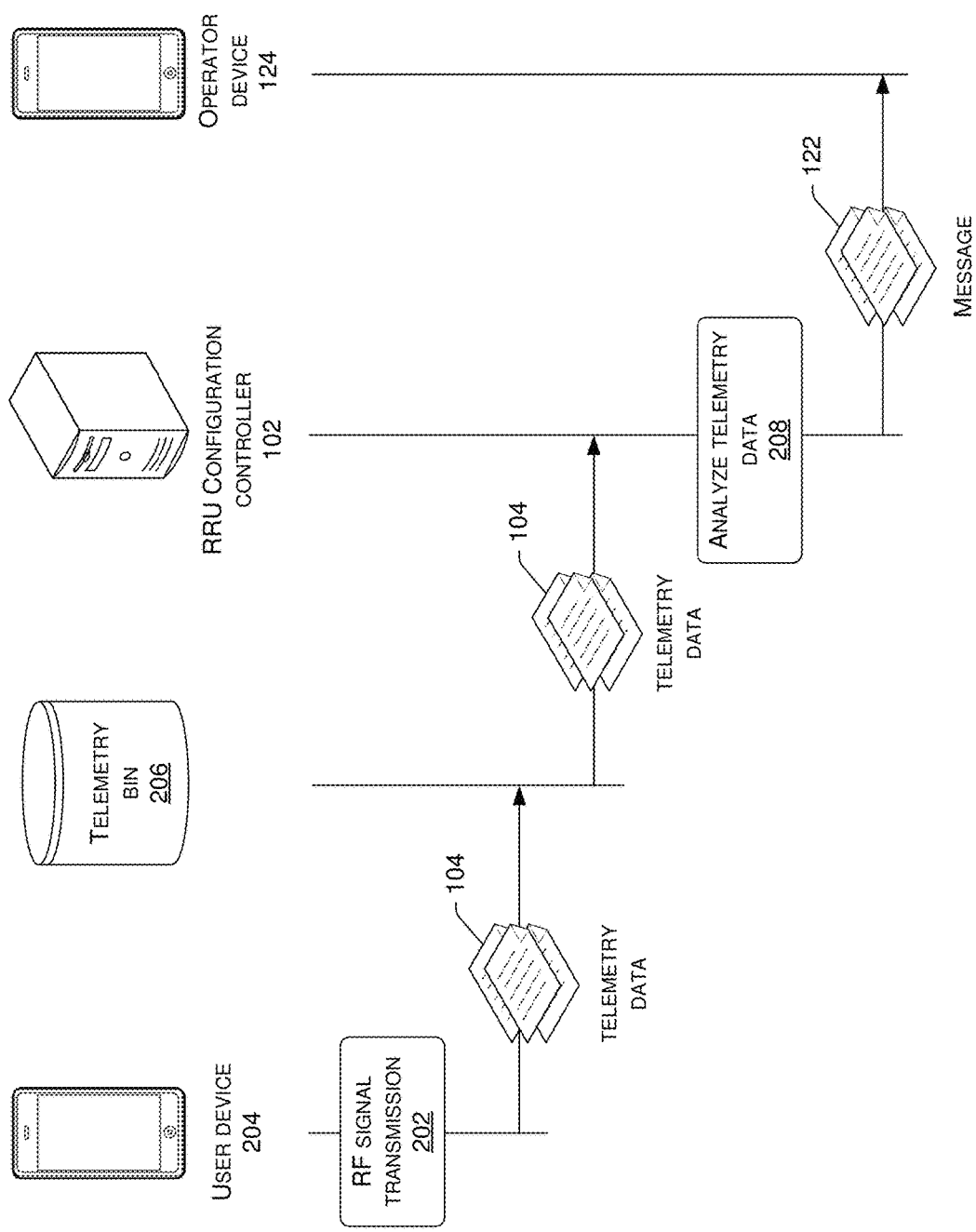
FIG. 2 illustrates a block diagram for an operation of the RRU configuration controller.

FIG. 2 illustrates a block diagram for an operation of the RRU configuration controller. The RRU configuration controller may capture telemetry data of a user device that is operating within a service sector of an RRU. The RF configuration controller is configured to capture the telemetry data at a telemetry bin 120(1) positioned within the service sector.

At 202, a user device 204 may transmit an RF signal to a telecommunications network while the user device 204 is within a predetermined distance of a telemetry bin 206. The user device 204 may perform similar functions to one of the user device(s) 112(1)-112(P), and the telemetry bin 206 may perform similar functions to one of the telemetry bin(s) 120(1)-120(P). At the telemetry bin 206, the RF configuration controller 102 may detect the presence of the user device 204 and pull telemetry data from the user device 112(1)-112(N) that is associated with the RF transmission. The RRU configuration controller 102 may monitor the telemetry bin 206 for telemetry data continuously or per a predetermined schedule, or a triggering event. The predetermined schedule may be one second, one minute, one hour, or any other suitably appropriate time interval. The triggering event may correspond to detecting an RF signal transmitted by a user device.

At 208, the RF configuration controller 102 may analyze the telemetry data 104, in combination with telemetry data captured from other user devices at the same telemetry bin and other telemetry bins within the service sector. In doing so, the RF configuration controller 102 may determine a signal QoS associated with the serving RRU. The RF configuration controller 102 may further analyze the signal QoS to determine whether the serving RRU is misconfigured. In one embodiment, the RF configuration controller 102 may compare the signal QoS with a predetermined QoS threshold. The predetermined QoS threshold represents a baseline of nominal performance for the serving RRU. A signal QoS less than the predetermined QoS threshold reflects an underperformance and a likely misconfigured RRU.

If the RF configuration controller 102 infers that an RRU is likely misconfigured, the RF configuration controller 102 may generate a message 122 for delivery to an operator device indicating that an RRU associated with a base station node is likely misconfigured. The message may also indicate that at least one other RRU is likely misconfigured since the misconfiguration is premised on a cable swap from a common, baseband unit.

Figure 3:
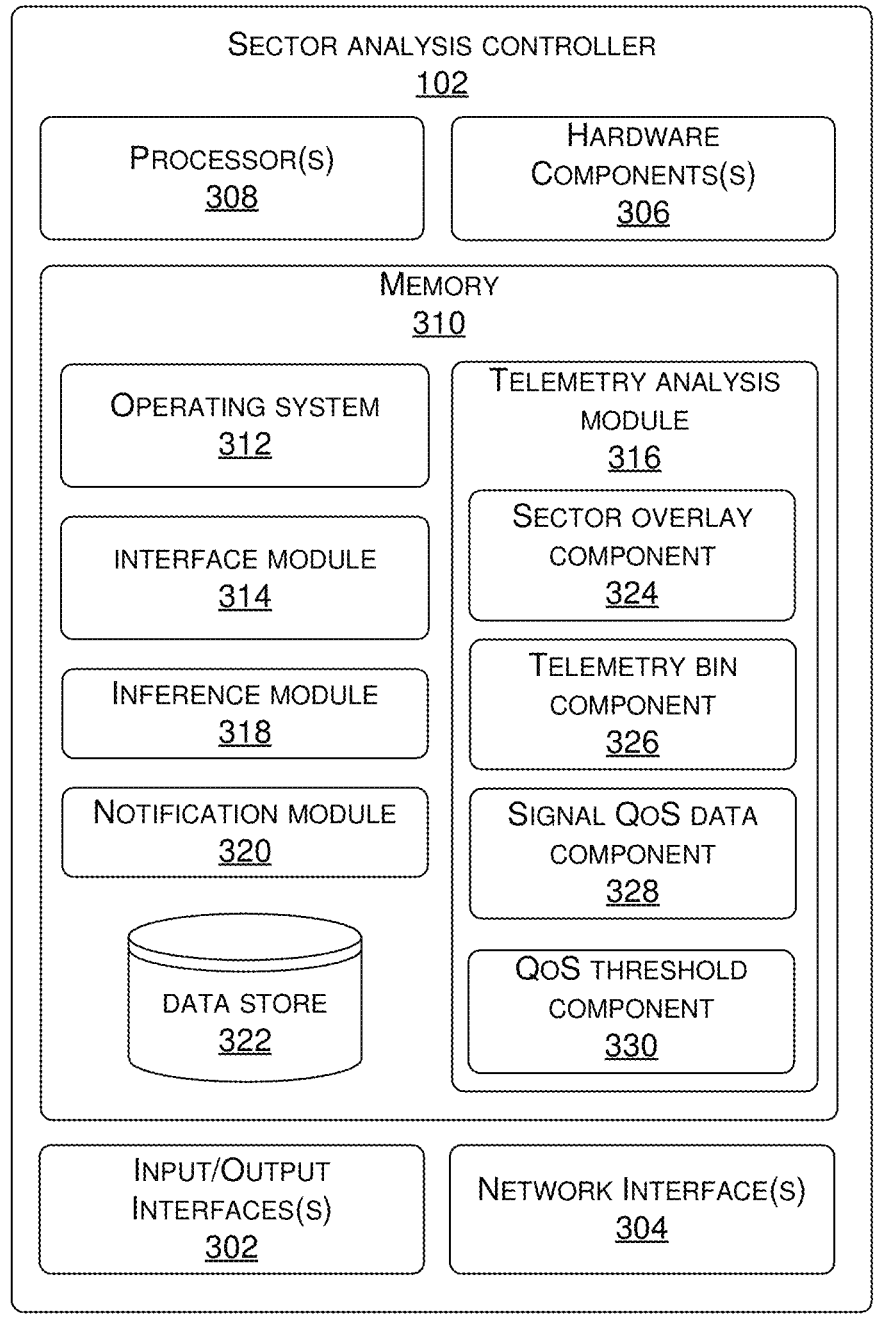
FIG. 3 illustrates various components of an example RRU configuration controller.

FIG. 3 illustrates various components of an example RRU configuration controller. The RRU configuration controller may analyze telemetry data associated with RRUs of a base station node and infer whether the RRUs are misconfigured. A misconfigured RRU may describe an RRU that is connected to a baseband unit using cables intended for another RRU. The cable swap may cause a marked reduction in RRU performance, ultimately impacting a user device's quality of experience. The RRU configuration controller is configured to interface with sectorized base station nodes, that is, base station nodes that are divided into multiple service sectors, whereby each service sector is serviced via dedicated RRUs. By way of example, a tri-sector base station node services three 120-degree radial sectors, each of which is served by a dedicated RRU (e.g. three RRUs in total).

The RRU configuration controller 102 may include input/output interface(s) 302. The input/output interface(s) 302 may include any suitable type of output interface known in the art, such as a display (e.g. a liquid crystal display), speakers, a vibrating mechanism, or a tactile feedback mechanism. Input/output interface(s) 302 also includes ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the RRU configuration controller 102 may include network interface(s) 304. The network interface(s) 304 may include any suitable sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the RRU configuration controller 102 may include one or more processor(s) 308 that are operably connected to memory 310. In at least one example, the one or more processor(s) 308 may be a central processing unit(s) (CPU), graphics processing unit(s) (GPU), or both a CPU and GPU or any suitable sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any suitable non-transitory medium which can be used to store the desired information.

In the illustrated example, the memory 310 may include an operating system 312, an interface module 314, a telemetry analysis module 316, an inference module 318, a notification module 320, and a data store 322. The operating system 312 may be any suitable operating system capable of managing computer hardware and software resources. The operating system 312 may include an interface layer that enables applications to interface with the input/output interface(s) 302 and the network interface(s) 304.

An interface module 314 may be configured to interact with user devices within a service sector of a base station node. The interface module 314 may capture telemetry data from user devices based on the location of the user devices relative to telemetry bins. The telemetry data may be captured directly from the user devices, or via a telecommunications network. The interface module 314 may be configured to interact with hardware-based telemetry bins (e.g. beacons) that detect the presence of user devices within a predetermined distance of the telemetry bins. Once detected, the interface module 314 may perform acts to pull the telemetry data from the user device.

The interface module 314 may also interface with an operator device associated with the base station node, to deliver messages, such as an indication that an RRU is likely misconfigured. The operator device may be associated with a field worker responsible for the base station node, an operator of the base station node, or any other suitable personnel that may correct a misconfigured RRU.

The telemetry analysis module 316 may further include a sector overlay component 324, a telemetry bin component 326, a signal QoS data component 328, and a QoS threshold component 330. The sector overlay component 324 may be configured to generate and overlay a polygon representation on a plan-view map of a service sector. The polygon representation may have a vertex at the base station and may overlay the substantial QoS bounds of the service sector. The QoS bounds of the service sector may be based on the geographic area within which the serving RRU can maintain an RF signal with signal QoS data that is greater than or equal to the predetermined QoS threshold. Accordingly, the profile of the polygon representation may be based on historical QoS values of the RRU (e.g. historical QoS values attributable to a properly configured RRU). The sector overlay component 324 may interact with the QoS threshold component 330 to define the bounds of the polygon representation.

While this disclosure describes the use of a polygon representation to bound a geographic area of a service sector, any suitable geometric shape may be adopted that reasonably reflects the QoS bounds of the service sector.

The telemetry bin component 326 may be configured to pull telemetry data from a plurality of telemetry bins located within a service sector. Telemetry bins may be positioned within a polygon representation of a service sector to capture a representative portion of telemetry data transmitted within the service sector. The representative portion of telemetry data may comprise an entirety, near-entirety, or a portion less than an entirety of the telemetry data within the service sector.

A telemetry bin may represent a discrete geographic location within a service sector of a base station node, from which telemetry data is captured. The telemetry bin, itself, may be software-based, such that the RRU configuration controller 102, via the interface module 314, may pull telemetry data from user devices that transmit RF signals and move within a predetermined proximity of the telemetry bin. The overlay of the geolocation of user devices and the discrete geographic location of a telemetry bin may act as a trigger event to capture telemetry data from the user devices. Alternatively, a telemetry bin may be hardware-based (e.g. a beacon). A beacon may employ a suitable wireless communication protocol to detect the presence of user devices that move within a predetermined proximity of the telemetry bin. Once detected, the RRU configuration controller 102 may pull the telemetry data from the user devices. Suitable wireless communication protocols may include 2G, 3G, Long-Term Evolution (LTE), 5G-New Radio (5G-NR), Bluetooth®, or Wi-Fi®. In this embodiment, the telemetry bin component 326 may interact with beacons positioned within the service sector.

By way of example, if a user device transmits an RF signal and moves into a geographic location that is proximate to a telemetry bin, the telemetry bin component 326 may capture the telemetry data associated with the user device (e.g. via a software or a hardware-based component). Collectively, telemetry bins within a service sector may capture an entirety, or near-entirety, of telemetry data transmitted within the service sector. By extension, the telemetry data captured at telemetry bins within a service sector may be used to quantify the performance of the serving RRU.

The signal QoS data component 328 may be configured to calculate a signal QoS data for telemetry data captured from telemetry bins within a service sector. The signal QoS data may describe or measure the overall performance of an RF signal associated with the RRU, based on the telemetry data. To measure signal QoS data, the RRU configuration controller may analyze a suitable combination of telemetry data including packet loss, bit rate, throughput, latency, availability, and jitter. The signal QoS data may include measurements of a Reference Signal Received Power (RSRP) and/or Reference Signal Received Quality (RSRQ), relative to industry QoS standards.

The RSRP is a measurement of the power present in a received radio signal for telecommunications networks, such as an LTE or 5G-NR network. The RSRP measures the power of LTE reference signals spread over the full bandwidth and narrow band. An RSRP that is greater than −80 dBm may indicate excellent signal strength with maximum data throughput rates. In contrast, an RSRP that is less than −110 dBm may indicate no signal strength. More granular RSRP measurements between −80 dBm and −110 dBm represent good, fair, and fair to poor signal strengths.

The RSRQ is a measurement of the quality of the received radio signal for telecommunications networks, such as an LTE or 5G-NR network. The RSRQ may provide additional information when RSRP is not sufficient to make a reliable handover or cell selection decision. An RSRQ that is greater than −10 dB may indicate excellent signal strength with maximum data throughput rates. In contrast, an RSRQ that is less than −20 dB may indicate no signal strength. More granular RSRQ measurements between −10 dB and −20 dB represent good, fair, and fair to poor signal strengths.

In a non-limiting example, consider a signal QoS data that is based at least in part on an RSRP measurement. If the RSRP measurement is greater than −80 dBm, this measurement may indicate excellent signal strength with maximum data throughput rates. Here, the signal QoS data is calculated to reflect better than expected performance In contrast, an RSRP that is less than −110 dBm may indicate no signal strength. Accordingly, the signal QoS data is calculated to reflect an underperformance The signal QoS data component 328 may calculate the signal QoS data for a service sector by aggregating the telemetry data from telemetry bins within the service sector and calculate the signal QoS data for the service sector based on the aggregated telemetry data. In another embodiment, signal QoS data component 328 may calculate a signal QoS data value for each of the telemetry bins within the service sector and determine the signal QoS data for the service sector by aggregating the signal QoS data values of each of the telemetry bins. The latter embodiment may be used by the inference module 318 to identify changes in signal QoS data across the geographic area of the service sector. Changes in signal QoS data may clarify whether an RRU underperformance is likely due to a misconfiguration or a localized RF signal obstruction.

The signal QoS data component 328 may calculate a QoS score to reflect the performance of an RRU, based on the signal QoS data of the service sector. The QoS score may reflect an analysis of the signal QoS data relative to the QoS threshold. In one embodiment, the QoS score may be based on the signal QoS data of individual telemetry bins. An aggregate of the QoS scores of each telemetry bin may be used to determine a QoS score for a service sector. In another embodiment, the QoS score may be based on an aggregate signal QoS data for the service sector.

The QoS score may be alpha-numeric (i.e. 0 to 10, or A to F), descriptive, (i.e. low, medium, or high), based on color (i.e. green, yellow, red), or any suitable rating scale. A high QoS score (i.e. 7 to 10, high, green) may indicate that the RRU is performing better than expected. A medium QoS score (e.g. 4 to 6, medium, yellow) may indicate that the RRU is performing as expected. A low QoS score (e.g. 1 to 3, low, red) may indicate that the RRU is underperforming.

The QoS threshold component 330 may be configured to define a QoS threshold for each serving RRU of a base station node. The QoS threshold acts as a service sector baseline of nominal performance that is expected from an RRU within a service sector. The QoS threshold component 330 may determine the QoS threshold based on historical telemetry data associated with the RRU. For example, the QoS threshold component 330 may retrieve, from the data store 322, historical telemetry data associated with the RRU (e.g. historical QoS values attributable to a properly configured RRU). The QoS threshold component 330 may employ one or more trained machine-learning algorithms to analyze the historical telemetry data to determine a QoS threshold. The QoS threshold may be based on any suitable combination signal QoS data (e.g. downlink throughput, uplink throughput, packet loss, latency, jitter, or echo) or measurements thereof (e.g. RSRP or RSRQ).

The inference module 318 may be configured to analyze signal QoS data and infer whether an RRU may be misconfigured. The inference module 318 may employ one or more machine-learning algorithms to analyze the signal QoS data within a service sector and determine whether the signal QoS data is indicative of a misconfigured RRU. In one embodiment, analysis of signal QoS data may comprise a comparison of signal QoS data (e.g. signal QoS data component 328) for a service sector relative to a predetermined QoS threshold (e.g. QoS threshold component 330). If the signal QoS data is less than the predetermined QoS threshold, the inference module 318 may infer that the RRU is likely misconfigured. If the signal QoS data is greater than or equal to the predetermined QoS threshold, the inference module 318 may infer that the RRU is likely properly configured.

In another embodiment, the inference module 318 may analyze the QoS score associated with the service sector. If the QoS score is low (e.g. 1 to 3, low, red), an inference that the RRU is likely misconfigured, may be drawn. If the QoS score is medium (e.g. 4 to 6, medium, yellow) or high (e.g. 7 to 10, high, green), an inference that the RRU is likely properly configured, may be drawn.

In yet another embodiment, the inference module 318 may employ one or more trained machine-learning algorithms to generate a statistical model that correlates the discrete geographic positions of telemetry bins with the historical signal QoS data. The historical signal QoS data may reflect an expected performance of the RRU across the geographic area of a service sector. In doing so, the inference module 318 may analyze real-time, or near-real-time signal QoS data associated with a service sector relative to datapoints of the statistical model to infer whether the RRU is misconfigured.

The inference module 318 may also determine whether an underperforming RRU is likely due to a misconfiguration or an RF signal obstruction. In this embodiment, the inference module 318 may analyze signal QoS data at telemetry bins within a service sector to determine whether underperformance is localized or more generally prevalent across the service sector. A local underperformance may be attributable to a physical or electromagnetic RF signal obstruction. Uniform underperformance within a service sector, or underperformance that gradually ensues with distance from the base station node, may be indicative of a misconfigured RRU.

In response to inferring that an RRU is likely misconfigured, the inference module 318 may also analyze other RRUs associated with the base station node. Since a misconfigured RRU is based on an inadvertent cable swap, if one RRU is misconfigured, then at least one other RRU associated with the base station node is likely misconfigured.

The notification module 320 may generate a message for delivery to an operator device indicating that an RRU associated with a base station node is likely misconfigured. The message may further indicate the likelihood of misconfiguration based on signal QoS data or a QoS score. Alternatively, the message may indicate that underperformance may be attributed to an RF signal obstruction, based on analysis of signal QoS data across telemetry bins. The message may also indicate that at least one other RRU is likely misconfigured since the misconfiguration is premised on a cable swap from a common, baseband unit.

The data store 322 may include a repository of historical telemetry data, historical signal QoS data, historical QoS scores, historical statistical models, and any suitable data pertinent to an operation of the RRU configuration controller 102.

The RRU configuration controller 102, via various modules and components may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 4:
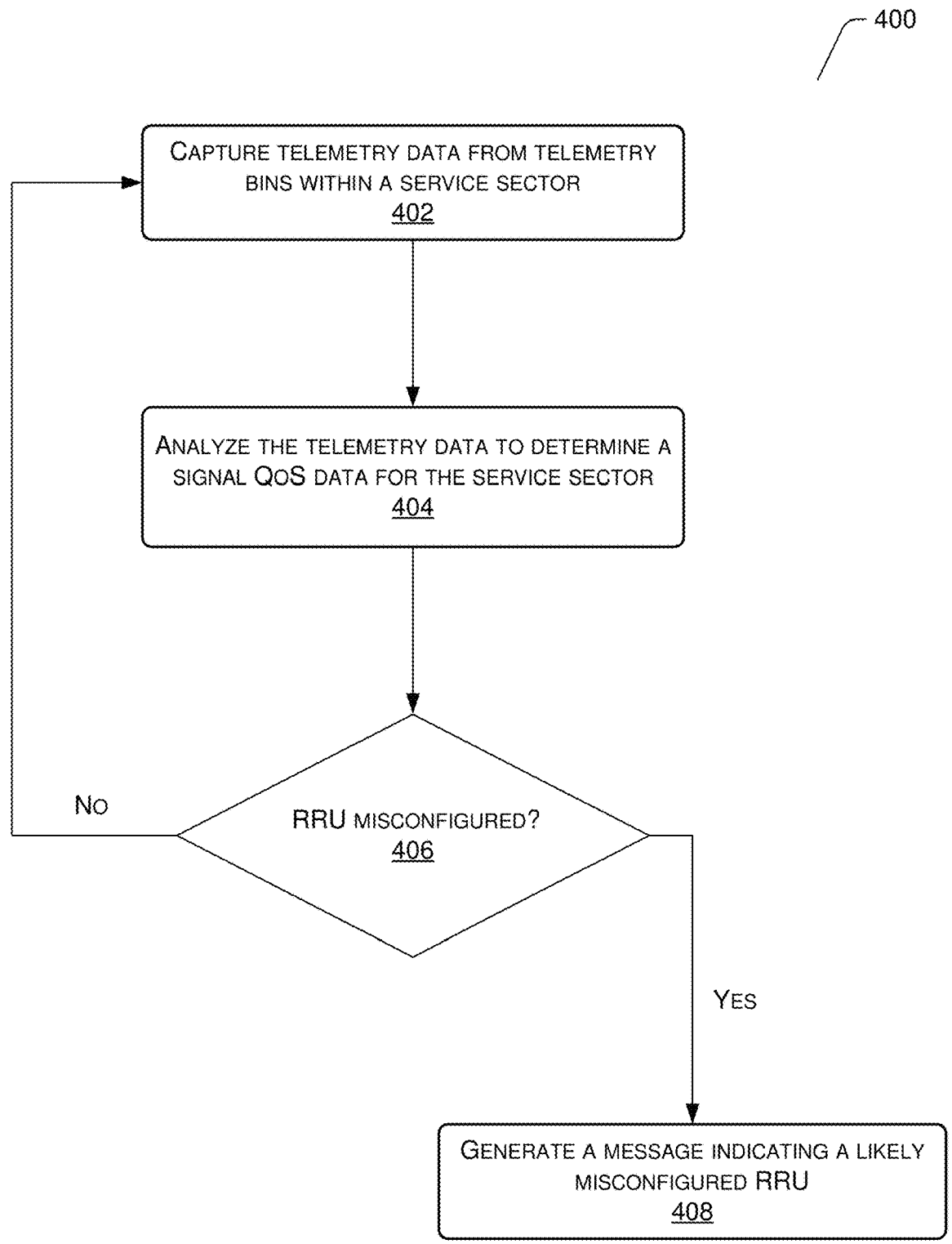
FIG. 4 illustrates an exemplary process for capturing telemetry data within a service sector of an RRU and determining whether the RRU is misconfigured, in accordance with at least one embodiment.
Figure 5:
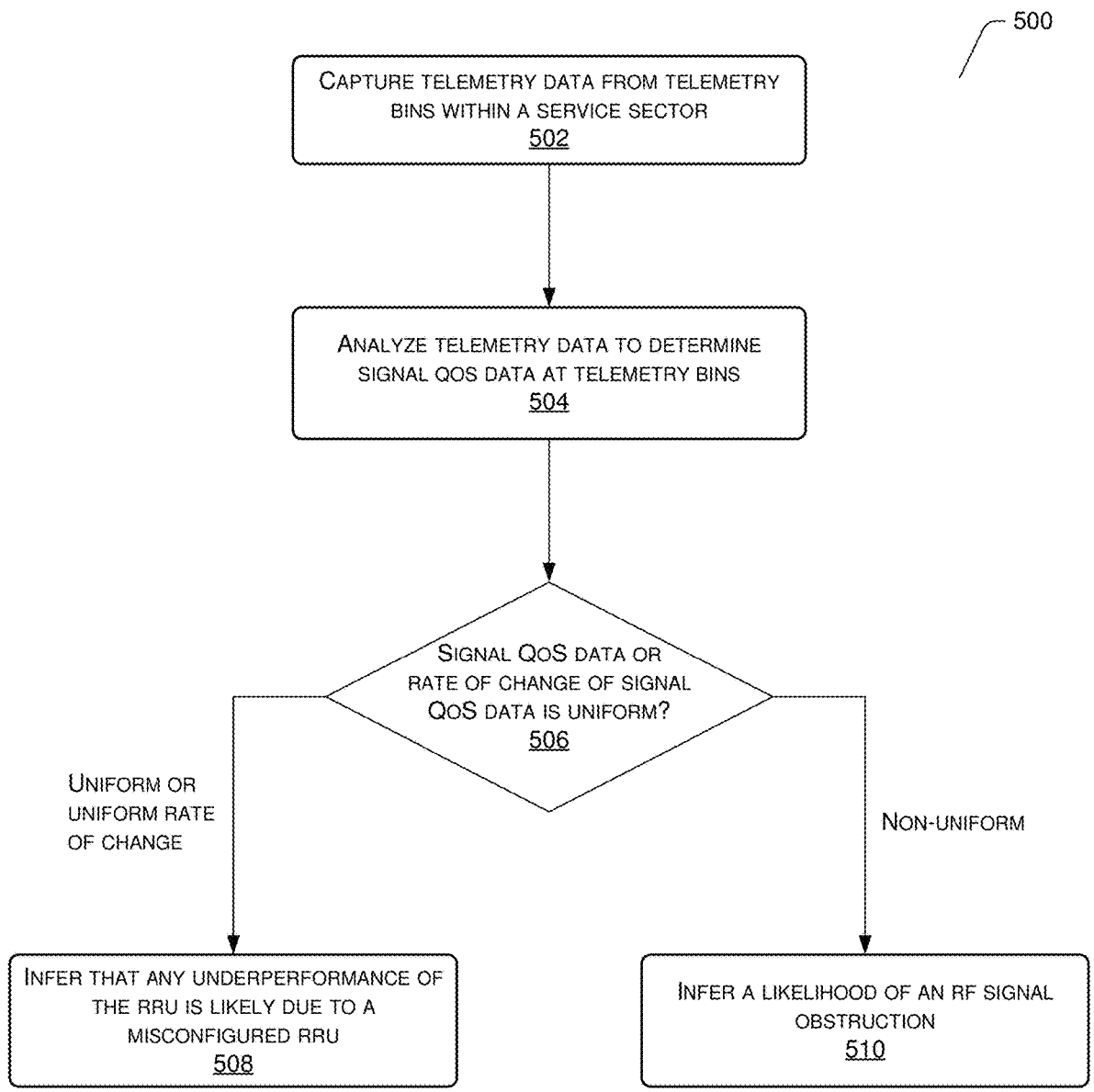
FIG. 5 illustrates an exemplary process for determining whether an RRU is misconfigured or subject to a localized RF signal obstruction, in accordance with at least one embodiment.

FIGS. 4 and 5 present processes 400 and 500 that relate to operations of the RF configuration controller 102. Each of processes 400 and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the computing environment 100 of FIG. 1.

FIG. 4 illustrates an exemplary process for capturing telemetry data within a service sector of an RRU and determining whether the RRU is misconfigured, in accordance with at least one embodiment. A misconfigured RRU may refer to an RRU that is connected to a baseband unit using a cable intended for another RRU. The inadvertent cable swap may cause the RRU to experience a marked reduction in performance, ultimately impacting a subscriber's quality of experience. Process 400 is described from the perspective of the RRU configuration controller.

At 402, the RRU configuration controller may capture telemetry data from user devices within a service sector of a base station. The RRU configuration controller may capture the telemetry data from a series of telemetry bins positioned throughout the service sector. The telemetry data be associated with RF signals transmitted by user devices while the user devices are proximate to a telemetry bin. The telemetry data may include downlink throughput, uplink throughput, packet loss, latency, jitter, echo, or any suitable combination thereof.

At 404, the RRU configuration controller may analyze the telemetry data to determine a signal QoS data associated with the service sector. The signal QoS data may describe or measure the overall performance of an RF signal associated with the RRU, based on the telemetry data, and as experienced by the user device. The signal QoS data may be based on suitable combinations of telemetry data and may also include measurements of a Reference Signal Received Power (RSRP) and/or Reference Signal Received Quality (RSRQ).

At 406, the RF configuration controller may compare the signal QoS data with an expected performance measure of the RRU to determine whether the RRU is likely misconfigured or performing as expected. In one embodiment, the RF configuration controller may compare the signal QoS data with a predetermined QoS threshold. The predetermined QoS threshold may be based on historical telemetry data and reflect the expected performance of the RRU. Signal QoS data that is less than the predetermined QoS threshold may reflect an underperforming RRU, indicative of a misconfiguration. Signal QoS data that is greater than or equal to the predetermined QoS threshold may reflect an expected, or better than expected, performance of the RRU.

In another embodiment, the RF configuration controller may generate a statistical model based on historical signal QoS data. The historical signal QoS data may reflect the expected performance of the serving RRU within the service sector. In doing so, signal QoS data may be analyzed relative to data-points of the statistical model to infer whether the RRU is misconfigured.

If the RF configuration controller determines that the RRU is properly configured, process 400 may return to process step 402 and continue to capture telemetry data from user devices within the service sector. Rather than ending process 400, the RF configuration controller may continuously capture telemetry data from the service sector, to lessen any time interval that a change in configuration at the RRU, or another RRU operating at the same base station node, may have on the quality of service within the service sector. If the RF configuration controller determines that the RRU is misconfigured, the process 400 may proceed to block 408.

At 408, the RF configuration controller may generate a message that indicates that the RRU is likely misconfigured. The message may also indicate that another RRU on the base station node is likely misconfigured since the misconfiguration is premised on a cable swap between RRUs.

The RF configuration controller may deliver the message to an operator device associated with the base station node. The operator device may be associated with a field worker responsible for the base station node, an operator of the base station node, or any other suitable personnel that may correct a misconfigured RRU.

FIG. 5 illustrates an exemplary process for determining whether an RRU is misconfigured or subject to a localized RF signal obstruction, in accordance with at least one embodiment. Process 500 is premised on the RRU configuration controller analyzing calculating signal QoS data relative to telemetry bins within a service sector. Since telemetry bins are positioned within a service sector at different geolocations, calculating signal QoS data relative to telemetry bins can provide visibility to changes in signal QoS data across the geographic area of the service sector. Process 500 is described from the perspective of the RRU configuration controller.

At 502, the RF configuration controller may capture telemetry data at a plurality of telemetry bins within a service sector of a base station node. The telemetry data may be associated with user devices that transmit RF signals (e.g. inbound or outboard RF transmissions) within a predetermined distance of a telemetry bin.

At 504, the RF configuration controller may analyze the telemetry data to determine a signal QoS data associated with each telemetry bin. In doing so, the RF configuration controller may generate a profile of signal QoS data across the geographic area of the service sector.

At 506, the RF configuration controller may analyze the profile of signal QoS data across the service sector to determine whether signal QoS data is uniform across the services sector, whether changes in signal QoS data are uniform within the service sector relative to the distance from the base station node, or whether changes in signal QoS data are localized to segment(s) of the service sector.

If the RF configuration controller determines that the signal QoS data is uniform or there is a uniform rate of change of signal QoS data relative to the distance from the base station node, the process 500 may proceed to block 508. Uniform signal QoS data may indicate that the signal QoS data is not impacted by an RF signal obstruction. A uniform rate of change of signal QoS data relative to a base station node may reflect an expected signal attenuation that is typical of RF signals. A uniform rate of signal attenuation with distance from the RRU can reflect a properly configured RRU. Accordingly, at 508, the RF configuration controller may infer that any underperformance of the RRU, as determined by process 400, is likely due to a misconfigured RRU.

Otherwise, if the RF configuration controller determines that the signal QoS data or the rate of change of signal QoS data relative to the distance from the base station node is non-uniform, the process 500 may proceed to block 510. At 510, the RF configuration controller may determine that changes in signal QoS data are localized to the segment(s)

of the service sector. Here, the localized change in signal QoS data is such that it does not reflect an expected signal attenuation of RF signals. Accordingly, the RF configuration controller may infer that an RF signal obstruction likely impacts the service sector.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more processors;
memory coupled to the one or more processors, the memory including one or more modules that are executable by the one or more processors to:
capture telemetry data within a service sector of a base station node;
determine a signal Quality of Service (QoS) associated with the service sector, based at least in part on the telemetry data;
infer whether a Remote Radio Unit (RRU) associated with the service sector is misconfigured due to the RRU being connected to a baseband unit of the base station node via a cable of the baseband unit that is intended for connecting another RRU to the baseband unit instead of the RRU, based at least in part on the signal QoS data; and
in response to a determination that the RRU is misconfigured, generate a message for delivery to a user device, the message indicating that the RRU associated with the service sector is likely misconfigured.

2. The system of claim 1, wherein the telemetry data includes at least one of signal strength, signal interference, data throughput, or data latency.

3. The system of claim 1, wherein the one or more modules are further executable by the one or more processors to:
determine an QoS threshold associated with the service sector, based at least in part on the RRU of the service sector, and
wherein, to infer that the RRU is misconfigured is based at least in part on a comparison of the signal QoS data and the QoS threshold.

4. The system of claim 3, wherein the one or more modules are further executable by the one or more processors to:
retrieve, from a data store, historical telemetry data associated with the RRU, and
wherein, to determine the QoS threshold for the RRU is based at least in part on the historical telemetry data.

5. The system of claim 1, wherein the one or more modules are further executable by the one or more processors to:
identify discrete geographic positions within the service sector as telemetry bins, the telemetry bins to capture individual instances of the telemetry data, and
wherein, to determine a signal QoS data is based at least in part on analysis of the telemetry data captured at the telemetry bins.

6. The system of claim 1, wherein the one or more modules are further executable by the one or more processors to:
generate a polygon representation to overlay a map of a geographic region serviced by the RRU, the polygon representation having a vertex at the base station node, and
wherein capturing telemetry within the service sector further comprises capturing telemetry data within an enclosure that is bound by the polygon representation.

7. The system of claim 1, wherein the one or more modules are further executable by the one or more processors to:
assign a QoS score to the telemetry data, based at least in part on the signal QoS data, and
wherein to infer that the RRU is misconfigured is based at least in part on the QoS score being less than a predetermined QoS threshold.

8. The system of claim 1, wherein, the RRU corresponds to a first RRU and the service sector corresponds to a first service sector,
wherein, the base station node comprises at least the first RRU that services the first service sector and a second RRU that serves a second sector,
wherein, the first RRU is communicatively connected to a baseband unit via a first cable and the second RRU is communicatively connected to the baseband unit via a second cable, and
wherein, to infer that the RRU misconfigured corresponds to inferring that the first RRU is connected to the baseband unit via the second cable.

9. The system of claim 1, wherein the RRU corresponds to a first RRU, wherein the base station node comprises the first RRU, a second RRU and a third RRU, and wherein the one or more modules are further executable by the one or more processors to:
in response to inferring that the first RRU is misconfigured, determine a second signal QoS data for a second set of telemetry bins associated with the second RRU and a third signal QoS data for a third set of telemetry bins associated with the third RRU; and
identify at least one of the second RRU or the third RRU as being misconfigured, based at least in part on the second signal QoS data and the third signal QoS data.

10. A computer-implemented method, comprising:
under control of one or more processors:
capturing, from individual telemetry bins within a service sector of a base station node, telemetry data associated with signal performance of an RRU of the base station node;
determining a signal QoS data for the individual telemetry bins, based at least in part on the telemetry data;
inferring whether the RRU associated with the service sector is misconfigured due to the RRU being connected to a baseband unit of the base station node via a cable of the baseband unit that is intended for connecting another RRU to the baseband unit instead of the RRU, based at least in part on the signal QoS data for the individual telemetry bins; and
in response to determining that the RRU is misconfigured, generating a message for delivery to a user device, the message indicating that the RRU associated with the service sector is likely misconfigured.

11. The computer-implemented method of claim 10, further comprising:
  determining an QoS threshold value for the service sector, based at least in part on historical QoS data associated with the RRU, and
  wherein, inferring whether the RRU is misconfigured is based at least in part on the QoS threshold value.

12. The computer-implemented method of claim 10, further comprising:
  retrieving, from a data-store, historical signal QoS data associated with the individual telemetry bins;
  generating a statistical model that correlates signal QoS data with discrete geographic positions within the service sector, based at least in part on the historical signal QoS data; and
  analyzing the signal QoS data for the individual telemetry bins with data-points of the statistical model, and
  wherein, inferring whether the RRU is misconfigured is based at least in part on a correlation of the signal QoS data with the data-points of the statistical model.

13. The computer-implemented method of claim 10, further comprising:
  generating a polygon representation to overlay a map of a geographic region serviced by the RRU, a profile of the polygon representation being based on historical QoS values that are greater than or equal to an QoS threshold value of the service sector; and
  identifying the individual telemetry bins within the service sector, based on geographic coordinates of the individual telemetry bins occurring in an enclosure created by the polygon representation.

14. The computer-implemented method of claim 10, further comprising:
  assigning a QoS score to the individual telemetry bins within the service sector, based at least in part on the signal QoS data; and
  generating a service sector QoS score by aggregating the QoS score of the individual telemetry bins, and
  wherein to infer that the RRU is misconfigured is based at least in part on the service sector QoS score being less than a predetermined QoS threshold.

15. The computer-implemented method of claim 10, wherein the RRU corresponds to a first RRU, and wherein the base station node comprises the first RRU, a second RRU and a third RRU, and further comprising:
  in response to inferring that the first RRU is misconfigured, determining a second signal QoS data for a second set of telemetry bins associated with the second RRU and a third signal QoS data for a third set of telemetry bins associated with the third RRU; and
  identifying at least one of the second RRU or the third RRU as being misconfigured, based at least in part on the second signal QoS data and the third signal QoS data.

16. A non-transitory computer-readable media storing computer-executable instructions that, when executed on one or more processors, collectively cause computers to perform acts comprising:
  capturing, from individual telemetry bins within a service sector of a base station node, telemetry data associated with signal performance of an RRU of the base station node;
  determining a signal QoS data for the individual telemetry bins within the service sectors;
  generating a service sector QoS by aggregating the signal QoS data for the individual telemetry bins;
  inferring whether the RRU associated with the service sector is misconfigured due to the RRU being connected to a baseband unit of the base station node via a cable of the baseband unit that is intended for connecting another RRU to the baseband unit instead of the RRU, based at least in part on the service sector QoS; and
  in response to determining that the RRU is misconfigured, generating a message for delivery to a user device, the message indicating that the RRU associated with the service sector is likely misconfigured.

17. The non-transitory computer-readable media of claim 16, wherein the signal QoS data includes at least one of signal strength, signal interference, data throughput, or data latency.

18. The non-transitory computer-readable media of claim 16, wherein acts further comprise:
  determining an QoS threshold value for the service sector, based at least in part on historical QoS data associated with the RRU, and
  wherein, inferring whether the RRU is misconfigured is based at least in part on a comparison of the service sector QoS and the QoS threshold value.

19. The non-transitory computer-readable media of claim 16, wherein the RRU corresponds to a first RRU, and wherein the base station node includes the first RRU and a second RRU, and
  wherein, inferring that the RRU is misconfigured corresponds to an inference that the RRU is communicatively coupled to a baseband unit via a cable associated with the second RRU.

20. The non-transitory computer-readable media of claim 16, wherein the RRU corresponds to a first RRU, wherein the base station node comprises the first RRU, a second RRU and a third RRU, and wherein the acts further comprise:
  in response to inferring that the first RRU is misconfigured, determining a second signal QoS data for a second set of telemetry bins associated with the second RRU and a third signal QoS data for a third set of telemetry bins associated with the third RRU; and
  identifying at least one of the second RRU or the third RRU as being misconfigured, based at least in part on the second signal QoS data and the third signal QoS data.

* * * * *